(12) United States Patent
Lo

(10) Patent No.: US 7,693,226 B1
(45) Date of Patent: Apr. 6, 2010

(54) AGGREGATION OVER MULTIPLE 64-66 LANES

(75) Inventor: William Lo, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 715 days.

(21) Appl. No.: 11/352,806

(22) Filed: Feb. 13, 2006

Related U.S. Application Data

(60) Provisional application No. 60/706,890, filed on Aug. 10, 2005.

(51) Int. Cl.
*H04L 27/28* (2006.01)
(52) U.S. Cl. ..................................................... 375/260
(58) Field of Classification Search ................. 375/242, 375/260, 354, 355, 359, 365, 366, 368; 370/315, 370/395.62, 507; 702/89; 713/375, 400; 708/525, 306
See application file for complete search history.

(56) References Cited

U.S. PATENT DOCUMENTS

| | | | |
|---|---|---|---|
| 6,362,757 B1 | 3/2002 | Lee et al. | |
| 6,430,201 B1 | 8/2002 | Azizoglu et al. | |
| 6,476,737 B1 | 11/2002 | Caroselli | |
| 6,504,493 B1 | 1/2003 | Burd | |
| 6,519,280 B1 | 2/2003 | Cole | |
| 6,718,139 B1 | 4/2004 | Finan et al. | |
| 6,813,651 B1 | 11/2004 | Smith et al. | |
| 6,823,483 B1 | 11/2004 | Creigh | |
| 7,089,485 B2 | 8/2006 | Azadet et al. | |
| 7,251,699 B1 | 7/2007 | Lo | |
| 7,339,995 B2* | 3/2008 | Renaud et al. | 375/242 |
| 7,373,454 B1* | 5/2008 | Noe | 711/108 |
| 2001/0034729 A1 | 10/2001 | Azadet et al. | |
| 2002/0138675 A1* | 9/2002 | Mann | 710/61 |
| 2003/0147654 A1 | 8/2003 | Sung et al. | |
| 2003/0187994 A1 | 10/2003 | Jackson | |
| 2005/0111532 A1 | 5/2005 | Creigh | |
| 2006/0209735 A1* | 9/2006 | Evoy | 370/315 |
| 2007/0215777 A1 | 9/2007 | Richenstein et al. | |

OTHER PUBLICATIONS

U.S. Appl. No. 10/601,235, filed Jun. 20, 2003, Lo, William.
IEEE Std 802.3-2002 (Revisiion of IEEE 802.3, 2000 Edition); IEEE Standard for Information technology—Telecommunications and information exchange between systems—local and metropolitan area networks—Specific requirements Part 3: Carrier sense multiple access with collison detection (CSMA/CD) access method and physical layer specifications; IEEE Computer Society; Sponsored by the LAN/MAN Standards Committee; Mar. 8, 2002; 1538 pages.
U.S. Appl. No. 11/415,937, filed May 2006, Lo.
U.S. Appl. No. 11/453,193, filed Jun. 2006, Lo.

* cited by examiner

*Primary Examiner*—Sam K Ahn

(57) ABSTRACT

An aggregation channel for providing data communication for M data streams to N data streams comprises a first first-in, first-out (FIFO) buffer module that receives the M data streams and realigns them with each other based on respective alignment symbols. A lane mapping module receives the realigned M data streams from the first FIFO buffer module and routes predetermined ones of the M data streams to predetermined ones of the N data streams, wherein each of the N data streams receives at least one of the alignment characters. M is greater than N, N is greater than 1, and each of the M data streams includes an alignment symbol.

52 Claims, 10 Drawing Sheets

AGGREGATION OVER MULTIPLE 64-66 LANES

CROSS-REFERENCE TO RELATED APPLICATIONS

This application claims the benefit of U.S. Provisional Application No. 60/706,890, filed on Aug. 10, 2005. The disclosure of the above application is incorporated herein by reference.

FIELD

The present disclosure relates to aggregating M channels of digital data into N channels of digital data.

BACKGROUND

Digital systems employ network connections and/or data buses, referred to collectively as communication channels, to communicate between various subsystems. For example, a central processing unit may communicate with a disc storage module through a channel. The bandwidth of the channel is determined by several factors including a number of parallel communication lanes in the channel. A given digital system can employ a number of various channels between its subsystems, with each channel being best suited to its particular application in the digital system.

In some circumstances, it is necessary for data to travel over more than one channel as it propagates from one subsystem to another. In such instances a first-in, first-out (FIFO) buffer can be employed between the two communication channels provided that they are both serial communication channels and/or clocked parallel channels.

In some cases the first channel includes a plurality of lanes that are not synchronized by a clock and the second channel is a serial channel. In such a case the data on each lane of the first channel can include an alignment symbol that is read by a buffer between the first channel and the second channel. The buffer can use the alignment symbols in the lanes to eliminate skew between the data arriving over the first channel, and then aggregate the realigned data onto the serial second channel.

SUMMARY

An aggregation channel for providing data communication for M data streams to N data streams comprises a first first-in, first-out (FIFO) buffer module that receives the M data streams and realigns them with each other based on respective alignment symbols. A lane mapping module receives the realigned M data streams from the first FIFO buffer module and routes predetermined ones of the M data streams to predetermined ones of the N data streams, wherein each of the N data streams receives at least one of the alignment characters. M is greater than N, N is greater than 1, and each of the M data streams includes an alignment symbol.

In other features, N encoders that receive the predetermined ones of the M data streams and encode the N data streams. N serializer/deserializer (SERDES) modules generate respective serial data streams based on associated ones of the N data streams. The first FIFO buffer module adds and removes idle characters from the M data streams to compensate for a difference in a first data rate of the M data streams and a second data rate of the N data streams.

In other features, a network device includes the aggregation channel of claim 1 and N first backplane channels carrying the N data streams. N second backplane channels communicate with a deaggregation channel. The N second backplane channels communicate with first N backplane channels through the aggregation channel and the deaggregation channel.

In other features the M data streams are divided into groups and each of the N data streams receives alignment characters from all of the groups. In some embodiments the M data streams are divided into groups and each of the N data streams receives alignment characters from less than all of the groups.

A deaggregation channel for providing data communication for N data streams to M data streams comprises a first first-in, first-out (FIFO) buffer module that receives and realigns the N data streams based on an alignment symbol included in each of the N data streams. A lane mapping module segments the realigned N data streams into the M data streams. Each of the M data streams includes at least one of the alignment symbols. M is greater than N and N is greater than 1. N decoders that decode associated ones of the N data streams. N serializer/deserializer (SERDES) modules generate parallel data streams based on associated ones of the N data streams. The first FIFO buffer module adds and removes idle characters from the M data streams to compensate for a difference in a first data rate of the M data streams and a second data rate of the N data streams.

In other features the M data streams are divided into groups and each of the groups receives alignment characters from all of the N data streams. In some embodiments the M data streams are divided into groups and each of the groups receives alignment characters from less than all of the N data streams.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

Figure 1:
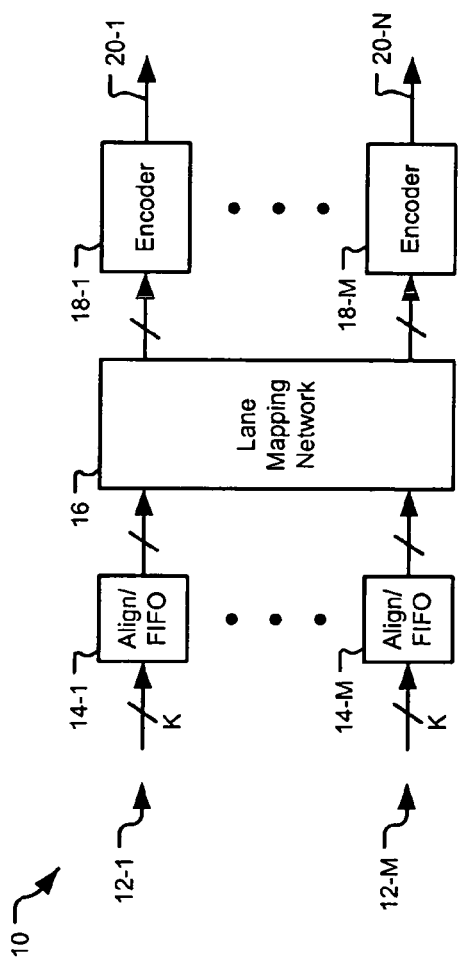
FIG. 1 is a functional block diagram of an M-to-N (M/N) aggregation channel.

The following description of the preferred embodiment(s) is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Referring now to FIG. 1, one of various embodiments of an aggregation channel 10 is shown. Aggregation channel 10 can be used to transmit from one network physical layer that uses a first data rate to a second network physical layer that uses a second data rate. Aggregation channel 10 receives M streams of parallel data through input channels 12-1, ..., 12-M, referred to collectively as input channels 12. Each stream of parallel data includes K data lanes. The arrival times of the data streams are generally skewed with respect to each other due to timing tolerances in upstream transmitters and unequal propagation delays through the communication channels.

Each stream of K data lanes communicates with a corresponding input of an alignment FIFO 14. Alignment FIFOs 14 use alignment symbols embedded in the data streams to resynchronize them and then retransmits them to a lane mapping network 16. Lane mapping network 16 redirects the resynchronized data streams to N encoders 18-1, ..., 18-N, referred to collectively as encoders 18. Each encoder 18 processes its associated data stream according to a predetermined algorithm to prevent baseline drift in a corresponding output data signal 20.

Figure 2:
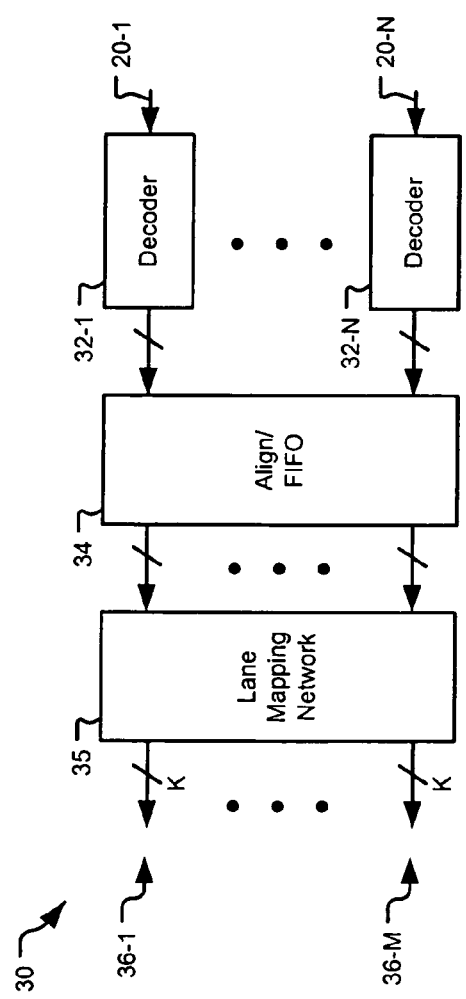
FIG. 2 is a functional block diagram of an N-to-M (N/M) deaggregation channel.

Referring now to FIG. 2, one of several embodiments of a deaggregation channel 30 is shown. Deaggregation channel 30 can be used in conjunction with aggregation channel 10 to communicate between two network nodes. In such a configuration, each network node communicates with a respective one of aggregation channel 10 and deaggregation channel 30. Aggregation channel 10 and deaggregation channel 30 then communicate with each other over a second network to complete the communication link between the two network nodes.

In deaggregation channel 30, data signals 20-1, ..., 20-N arrive at inputs of corresponding decoders 32-1, ..., 32-N. Decoders 32 process the data signals 20 according to an inverse of the algorithm employed by encoders 18. Outputs of decoders 32 communicate the recovered data streams to corresponding inputs of an alignment FIFO 34. Alignment FIFO 34 resynchronizes the data streams and applies them to a lane mapping network 35, which redirects the resynchronized data streams to M output channels 36-1, ..., 36-M, each including K data lanes. The data streams at output channels 36-1, ..., 36-M are reproductions of the respective data streams at data channels 12-1, ..., 12-M.

Figure 3:
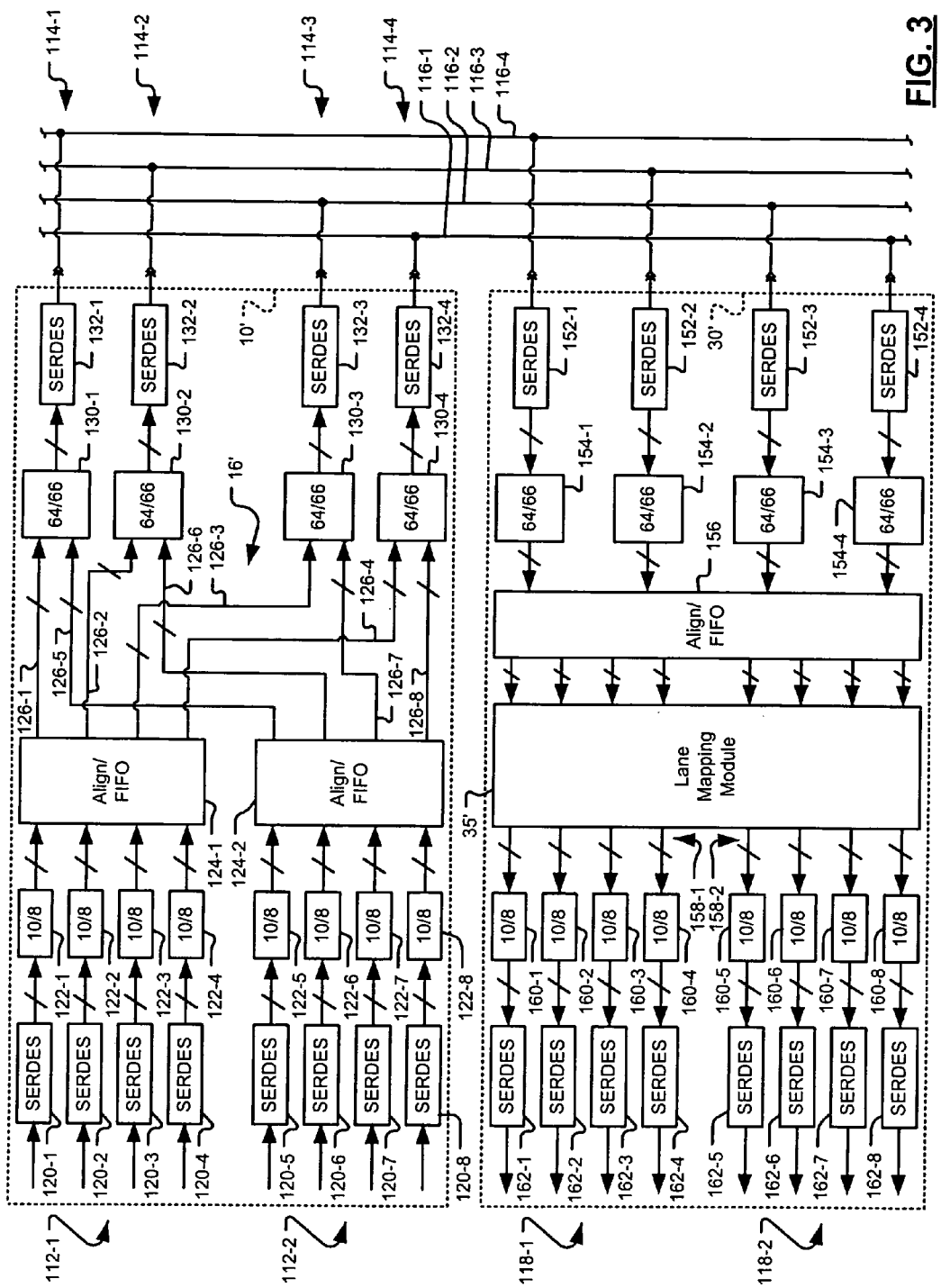
FIG. 3 is a functional block diagram of an 8-to-4 (8/4) aggregation channels communicating with a 4-to-8 (4/8) deaggregation channel.

Referring now to FIG. 3, one of several implementations of aggregation channel 10 and deaggregation channel 30 is shown. An 8/4 aggregation channel 10' receives data at 20 Gbit/s through a pair of 10GBASE-X connections 112-1, 112-2. Each 10GBASE-X connection includes 4 data lanes. Aggregation channel 10' combines the data into 4 data paths that communicate over respective backplane lanes 116-1, ..., 116-4, referred to collectively as backplane 116. Each lane of backplane 116 communicates at (66/64)*5 Gbit/sec≈5.15625 Gbit/sec, thereby providing a total backplane bandwidth of approximately 19.39 Gbit/sec. A deaggregation channel 30' receives data from backplane 116 and converts it back to the 10GBASE-X format of a second pair of connections 118-1, 118-2.

Operation of aggregation channel 10' and deaggregation channel 30' will now be described in more detail. The four data streams of each 10GBASE-X connection 112 communicate with inputs of respective serializer/deserializer (SERDES) modules 120-1, ..., 120-8, referred to collectively as SERDES modules 120. An output of each SERDES module 120 communicates with an input of an associated 10/8 decoder module 122. Outputs of decoder modules 122-1, ..., 122-4 communicate the four data streams of 10GBASE-X connection 112-1 to respective inputs of an alignment FIFO 124-1. Outputs of decoder modules 122-5, ..., 122-8 communicate the four data streams of 10GBASE-X connection 112-2 to respective inputs of an alignment FIFO 124-2.

Each data stream includes alignment symbols "A", idle symbols "K", and add/drop symbols "R". Alignment FIFOs 124 can add add/drop symbols "R" as necessary to buffer the data streams between the different bus speeds of 10GBASE-X connections 112 and backplane 116. Alignment FIFOs 124 also synchronize the incoming data streams on the alignment symbols "A" before forwarding them to respective outputs 126. In an alternate configuration, the A, K and R are converted to plain idle symbols and the FIFO adds/drops the plain idle symbols as needed. A, K and R can then be regenerated on the encoder side.

Four 64/66 encoders 130-1, ..., 130-4, referred to collectively as 64/66 encoders 130, each include first and second input ports that receive the data streams from associated ones of outputs 126. The connections between outputs 126 and the first and second inputs of decoders 130 form a lane mapping network 16' and determine a packing order of the data streams at respective outputs of 64/66 encoders 130.

In the depicted arrangement, output 126-1 communicates with the first input of 64/66 encoder 130-1, output 126-2 connects to the first input of 64/66 encoder 130-2, output 126-3 connects to the first input of 64/66 encoder 130-3, output 126-4 connects to the first input of 64/66 encoder 130-4, output 126-5 connects to the second input of 64/66 encoder 130-1, output 126-6 connects to the second input of 64/66 encoder 130-2, output 126-7 connects to the second input of 64/66 encoder 130-3, and output 126-8 connects to the second input of 64/66 encoder 130-4. This arrangement of lane mapping network 16' results in a packing order shown in FIG. 5, which is described below in more detail. Each 64/66 encoder 130 includes an output that communicates with an input of an associated SERDES module 132. Each SERDES module 132 converts the packed data appearing at its input to a serial stream on an associated lane of backplane 116.

Deaggregation channel 30' receives the four serial streams of data from backplane 116 and converts them back to 10GBASE-X signals at connections 118-1, 118-2. SERDES modules 152-1, . . . , 152-4 receive respective ones of the serial streams from backplane 116 and communicate them to inputs of respective 64/66 decoders, 154-1, . . . , 154-4. Each 64/66 decoder 154 decodes an associated packed data stream and forwards the decoded packed data stream to an input of an alignment FIFO 34'. Alignment FIFO 156 uses the preserved alignment symbols "A" to resynchronize the packed data streams and thereby eliminate any signal skew that accumulated in backplane 116. Alignment FIFO 34' communicates the realigned packed data streams to a lane mapping module 35' that parses the two 10GBASE-X data paths embedded in each packed data stream. Lane mapping module 35' communicates the parsed data to one of a respective pair of outputs 158-1, 158-2 depending on a packing order of each packed data stream. Each output 158 communicates its four reaggregated 10GBASE-X data lanes though a respective 10/8 encoder 160 and SERDES module 162. Each restored 10GBASE-X connection 118-1, 118-2 includes outputs of four associated SERDES modules 162.

Figures 4, 5:
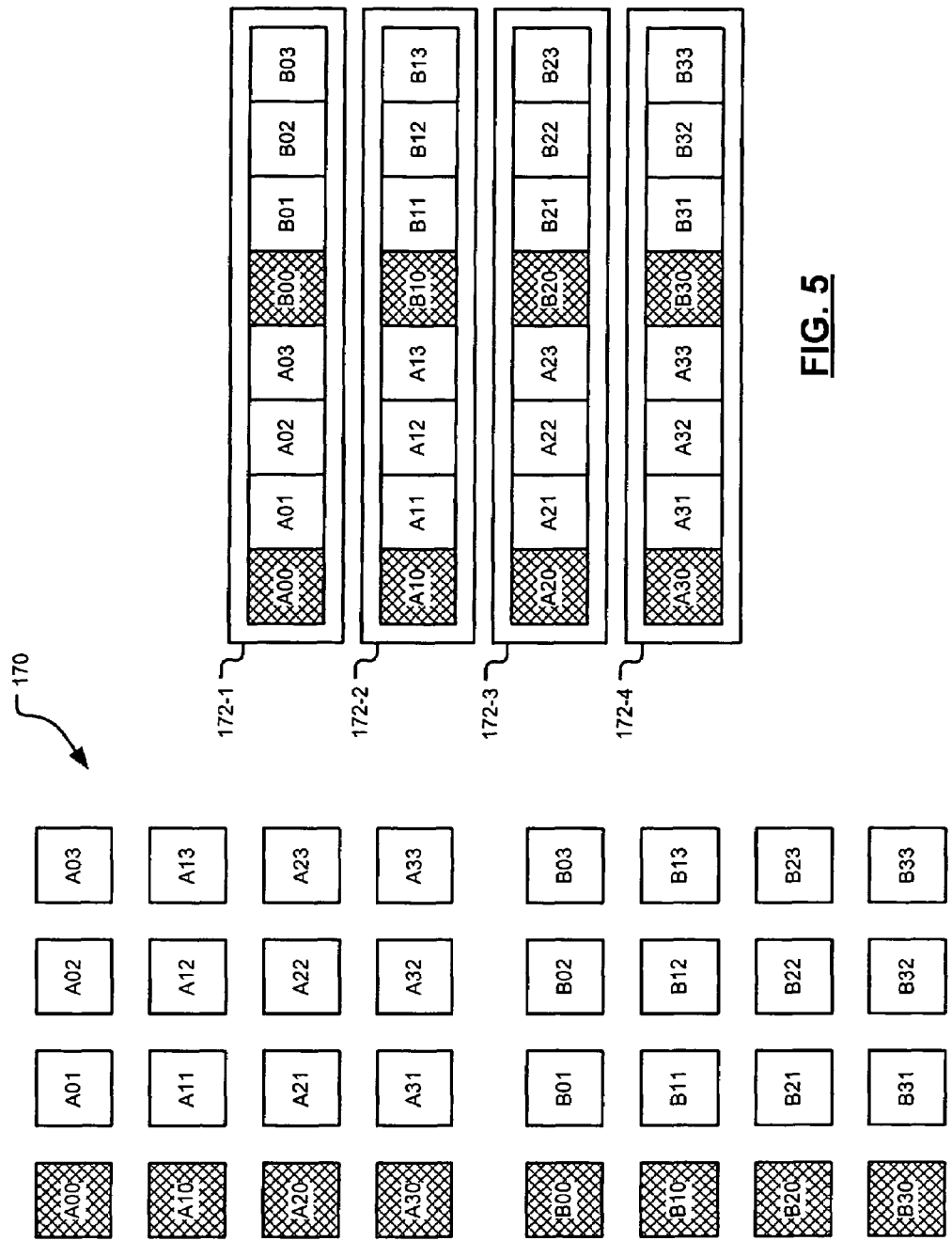
FIG. 4 is a data diagram of data entering the 8/4 aggregation channel of FIG. 3
FIG. 5 is a data diagram of data outputs of the 8/4 aggregation channel of FIG. 3 according to a first method.

Referring now to FIG. 4, a data diagram 170 is shown of data bytes in each of the two 10GBASE-X connections 112-1, 112-2 at the inputs of their respective SERDES module 120. Each block represents one byte, with the bytes in the left column occurring first in time. Each block includes an alphanumeric label, where the first character is either an "A" or "B" to indicate first 10GBASE-X connection 112-1 and second 10GBASE-X connection 112-2, respectively. The second character represents the data lane number, and the third character represents the byte order in time. The first bytes, i.e. XX0, are shaded to indicate that they each include an alignment symbol "A".

Referring now to FIG. 5, the data bytes of FIG. 4 are shown after being packed into 64 byte blocks 172-1, . . . , 172-4 by the lane mapping network 16' and 64/66 encoders 130 (FIG. 3). Lane mapping network 16' of FIG. 3 places the four data paths associated with first 10GBASE-X connection 112-1 first in the 64 byte block 172. Lane mapping network 16' then completes each 64 byte block 172 with the bytes from the four data paths associated with second 10GBASE-X connection 112-2. This packing order retains the parallel relationship between the alignment symbols "A" of each data lane and thereby enables the deaggregation channel 30' to realign and restore the individual data paths of the 10GBASE-X connections.

Figure 6:
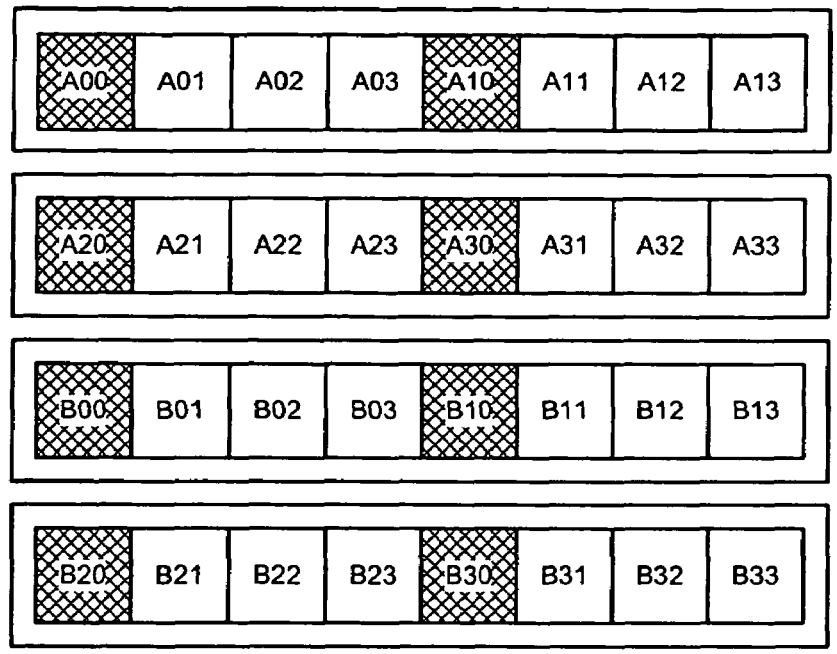
FIG. 6 is a data diagram of data outputs of an 8/4 aggregation channel according to a second method.

Referring now to FIG. 6, an alternative packing order 174 is shown. The alternative packing order 174 can be achieved by rerouting the lane mapping network 16' such that the four outputs of alignment FIFO 124-1 communicate with the first and second inputs of each 64/66 encoder 130-1 and 130-2, and the four outputs of alignment FIFO 124-2 communicate with the first and second input of each 64/66 encoder 130-3 and 13-4. The alternative packing order 174 also preserves the parallel relationship between the bytes containing alignment symbols "A" (shaded blocks) and thereby enables the deaggregation channel 30' to realign and restore the individual data paths of the 10GBASE-X channels. Other packing orders may also be used provided that the bytes containing the alignment symbols "A" remain packed in a 64 byte block with their associated data bytes and each packed 64 byte block begins with a byte containing an alignment character "A".

Figure 7:
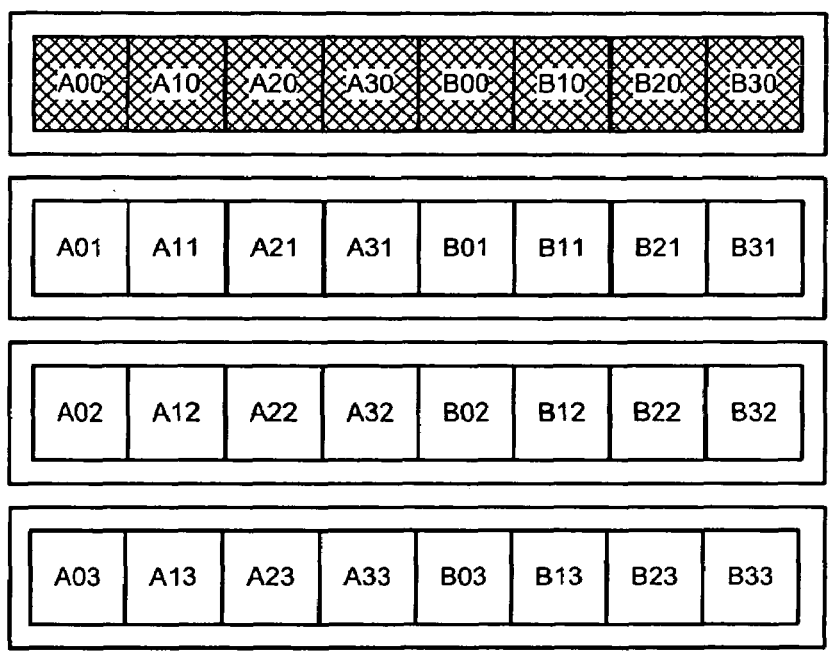
FIG. 7 is a data diagram of data outputs of an 8/4 aggregation channel according to an improper method.

Referring now to FIG. 7, an example of an improper packing order is shown. This packing order should be avoided because three of the four 64 byte blocks do not contain bytes including the alignment symbol "A" and therefore cannot be realigned with respect to each other.

Figure 8A:
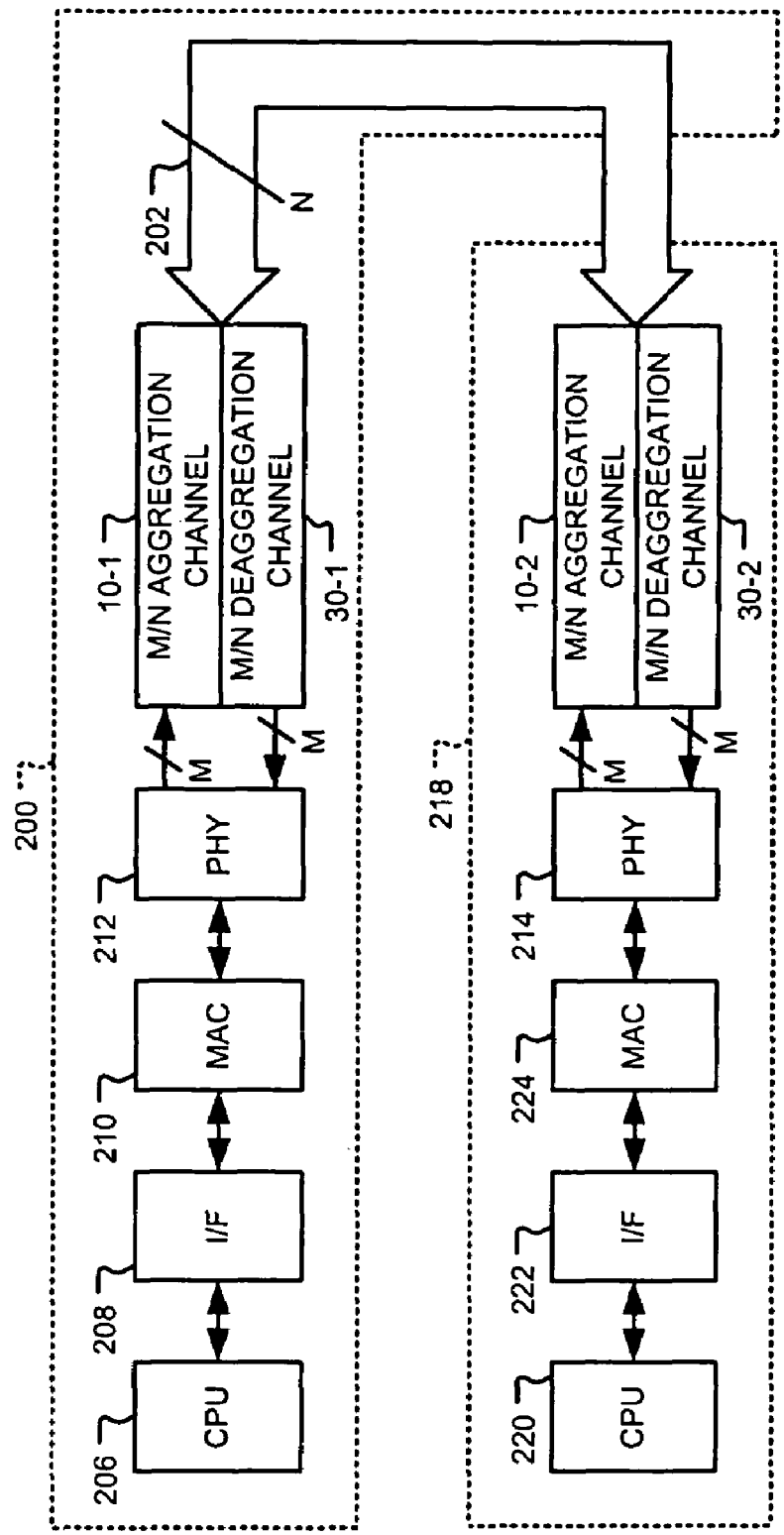
FIG. 8A is a functional block diagram of a first computer backplane that communicates with a plug-in printed circuit board via an aggregation channel and a deaggregation channel.
Figure 8B:
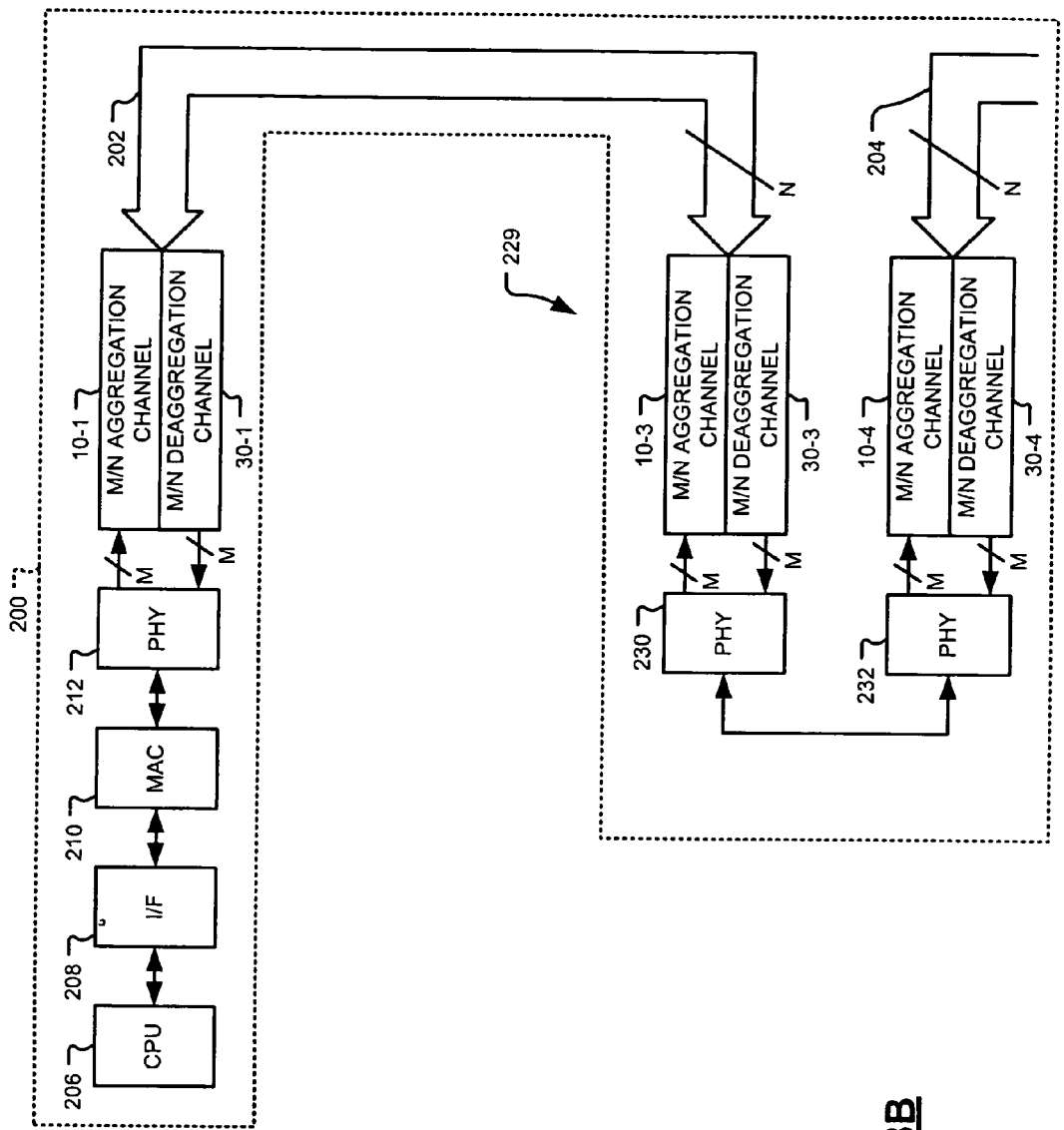
FIG. 8B is a functional block diagram of a second computer backplane that communicates with a third computer backplane via an aggregation channel and a deaggregation channel.

Referring now to FIGS. 8A and 8B, example implementations are shown for aggregation channel 10 and deaggregation channel 30. In FIG. 8A aggregation channel 10 and deaggregation channel 30 provide communication between a computer card cage 200 and a plug-in printed circuit board (PCB). Computer card cage 200 includes a first backplane 202 and a host microprocessor 206. Microprocessor 206 communicates with a media access controller (MAC) 210 via an interface module 208. MAC 210 communicates with a physical layer module (PHY) 212, such as a 10GBASE-X transceiver. PHY 212 includes M communication paths and first backplane 202 includes N communication paths. A first aggregation channel 10-1 and first deaggregation channel 30-1 complete the communication link between PHY 212 and first backplane 202.

PCB 218 connects to first backplane 202. PCB 218 includes a peripheral CPU 220 that communicates with PHY 214 via an interface module 222 and MAC 224. PHY 220 can be a 10GBASE-X transceiver that includes M communication paths. A second aggregation channel 10-2 and second deaggregation channel 30-2 complete the communication link between PHY 214 and first backplane 202.

Referring now to FIG. 8B, computer card cage 200 further includes a second backplane 204. First backplane 202 can communicate with second backplane 204 through a repeater 229. Repeater 229 includes third and fourth aggregation and deaggregation channels 10-3, 10-4, 30-3, and 30-4. A third PHY 230 communicates with a fourth PHY 232, third aggregation channel 10-3, and third deaggregation channel 30-3. Fourth PHY 232 also communicates with third PHY 230, fourth aggregation channel 10-4 and fourth deaggregation channel 30-4. Third aggregation channel 10-3 and third deaggregation channel 30-3 interface with first backplane 202. Fourth aggregation channel 10-4 and fourth deaggregation channel 30-4 interface with second backplane 204.

Figure 9B:
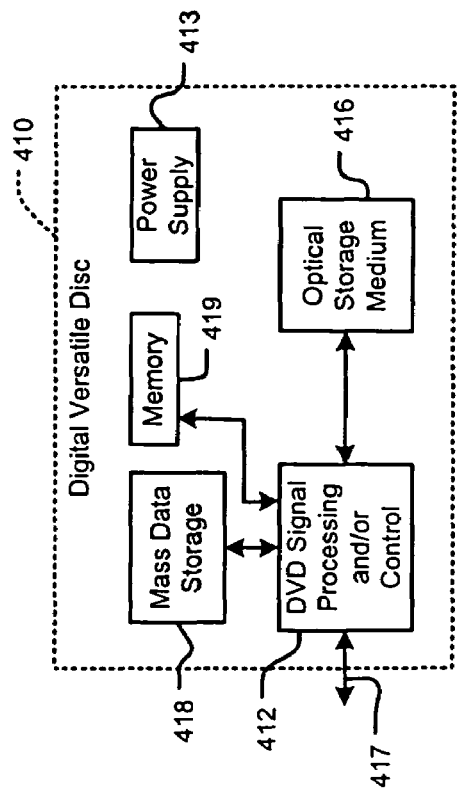
FIG. 9B is a functional block diagram of a digital versatile disk (DVD)
Figure 9A:
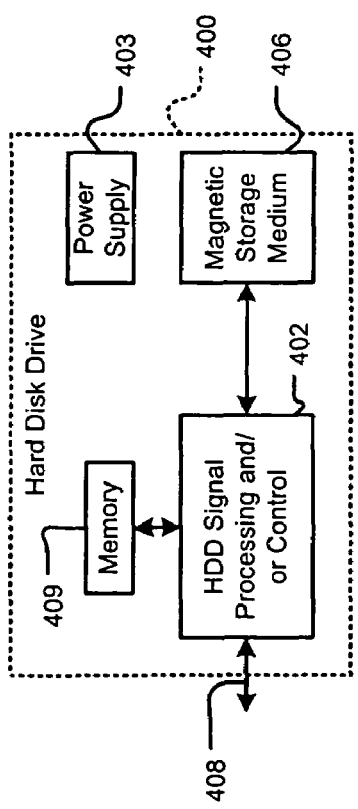
FIG. 9A is a functional block diagram of a hard disk drive.

Referring now to FIGS. 9A-9G, other exemplary implementations are shown. Referring now to FIG. 9A, the device can be implemented in a hard disk drive 400. The device may implement and/or be implemented in either or both signal processing and/or control circuits, which are generally identified in FIG. 9A at 402. In some implementations, the signal processing and/or control circuit 402 and/or other circuits (not shown) in the HDD 400 may process data, perform coding and/or encryption, perform calculations, and/or format data that is output to and/or received from a magnetic storage medium 406.

The HDD 400 may communicate with a host device (not shown) such as a computer, mobile computing devices such as personal digital assistants, cellular phones, media or MP3 players and the like, and/or other devices via one or more wired or wireless communication links 408. The HDD 400 may be connected to memory 409 such as random access memory (RAM), low latency nonvolatile memory such as flash memory, read only memory (ROM) and/or other suitable electronic data storage. In some implementations the HDD 400 may include a power supply 403.

Referring now to FIG. 9B, the device can be implemented in a digital versatile disc (DVD) drive 410. The device may implement and/or be implemented in either or both signal processing and/or control circuits, which are generally identified in FIG. 9B at 412. The signal processing and/or control circuit 412 and/or other circuits (not shown) in the DVD drive 410 may process data, perform coding and/or encryption, perform calculations, and/or format data that is read from and/or data written to an optical storage medium 416. In some implementations, the signal processing and/or control circuit 412 and/or other circuits (not shown) in the DVD drive 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD drive 410 may communicate with mass data storage 418 that stores data in a nonvolatile manner. The mass data storage 418 may include a hard disk drive (HDD). The HDD may have the configuration shown in FIG. 9A. The HDD may be a mini HDD that includes one or more platters having a diameter that is smaller than approximately 1.8". The DVD drive 410 may be connected to memory 419 such as RAM, ROM, low latency nonvolatile memory such as flash memory and/or other suitable electronic data storage. The DVD drive 410 may include a power supply 413.

Figure 9D:
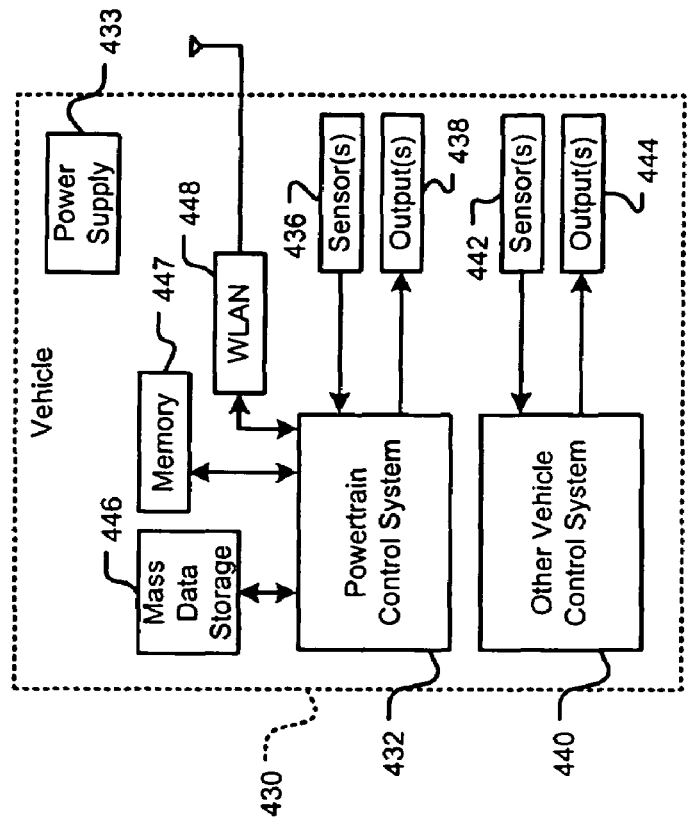
FIG. 9D is a functional block diagram of a vehicle control system.
Figure 9C:
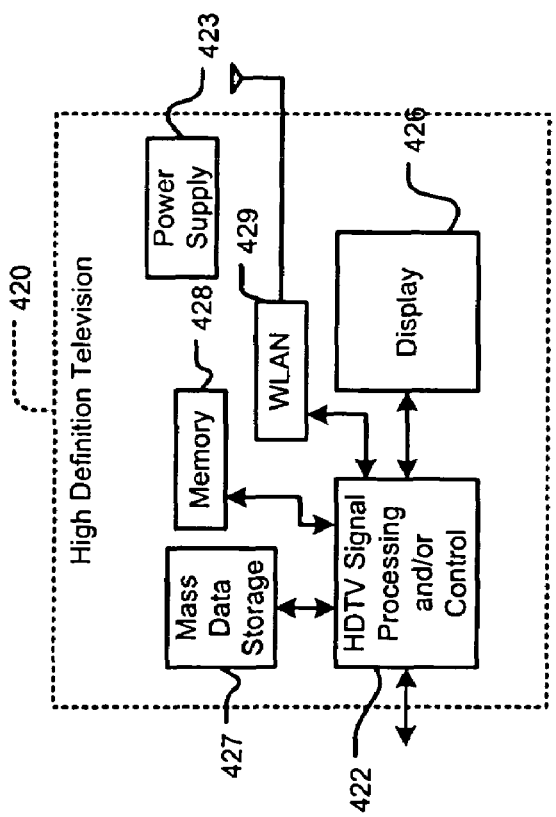
FIG. 9C is a functional block diagram of a high definition television.

Referring now to FIG. 9C, the device can be implemented in a high definition television (HDTV) 420. The device may implement and/or be implemented in either or both signal processing and/or control circuits, which are generally identified in FIG. 9E at 422. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. At least one HDD may have the configuration shown in FIG. 9A and/or at least one DVD may have the configuration shown in FIG. 9B. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429. The HDTV 420 may include a power supply 423.

Referring now to FIG. 9D, the device may implement and/or be implemented in a control system of a vehicle 430. In some implementations, the device implement a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The device may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown). The vehicle 430 may include a power supply 433.

Figure 9E:
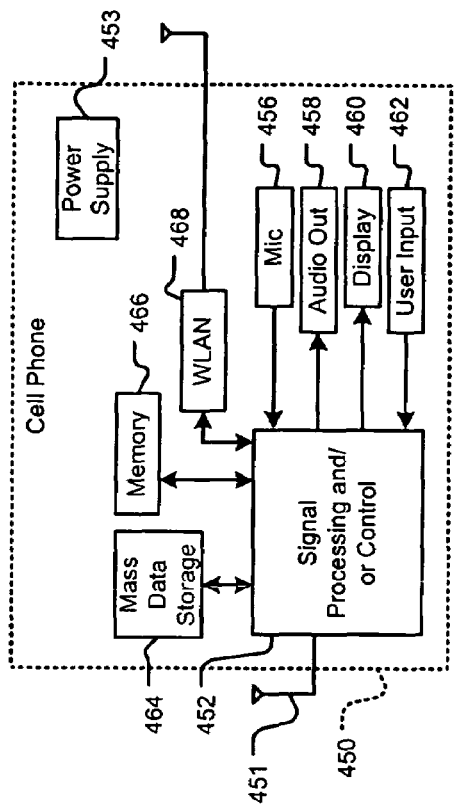
FIG. 9E is a functional block diagram of a cellular phone.

Referring now to FIG. 9E, the device can be implemented in a cellular phone 450 that may include a cellular antenna 451. The device may implement and/or be implemented in either or both signal processing and/or control circuits, which are generally identified in FIG. 9E at 452. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468. The cellular telephone 450 may include a power supply 453.

Figure 9F:
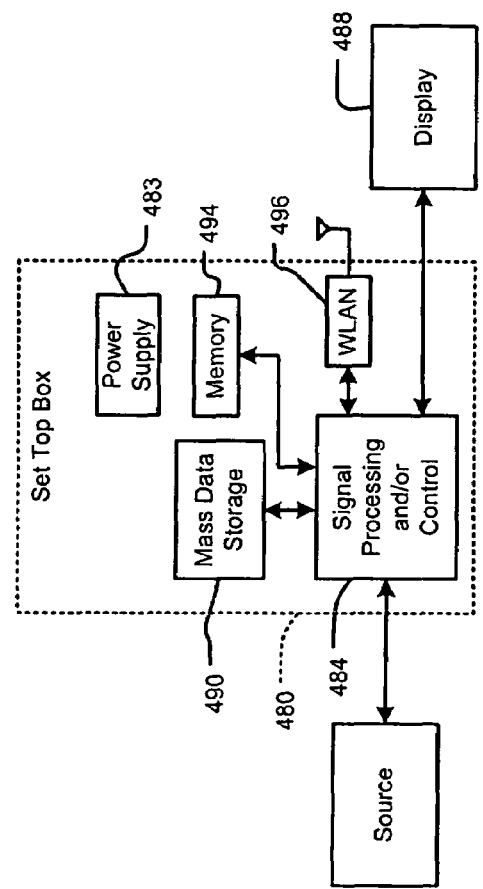
FIG. 9F is a functional block diagram of a set top box.

Referring now to FIG. 9F, the device can be implemented in a set top box 480. The device may implement and/or be implemented in either or both signal processing and/or control circuits, which are generally identified in FIG. 9F at 484. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496. The set top box 480 may include a power supply 483.

Figure 9G:
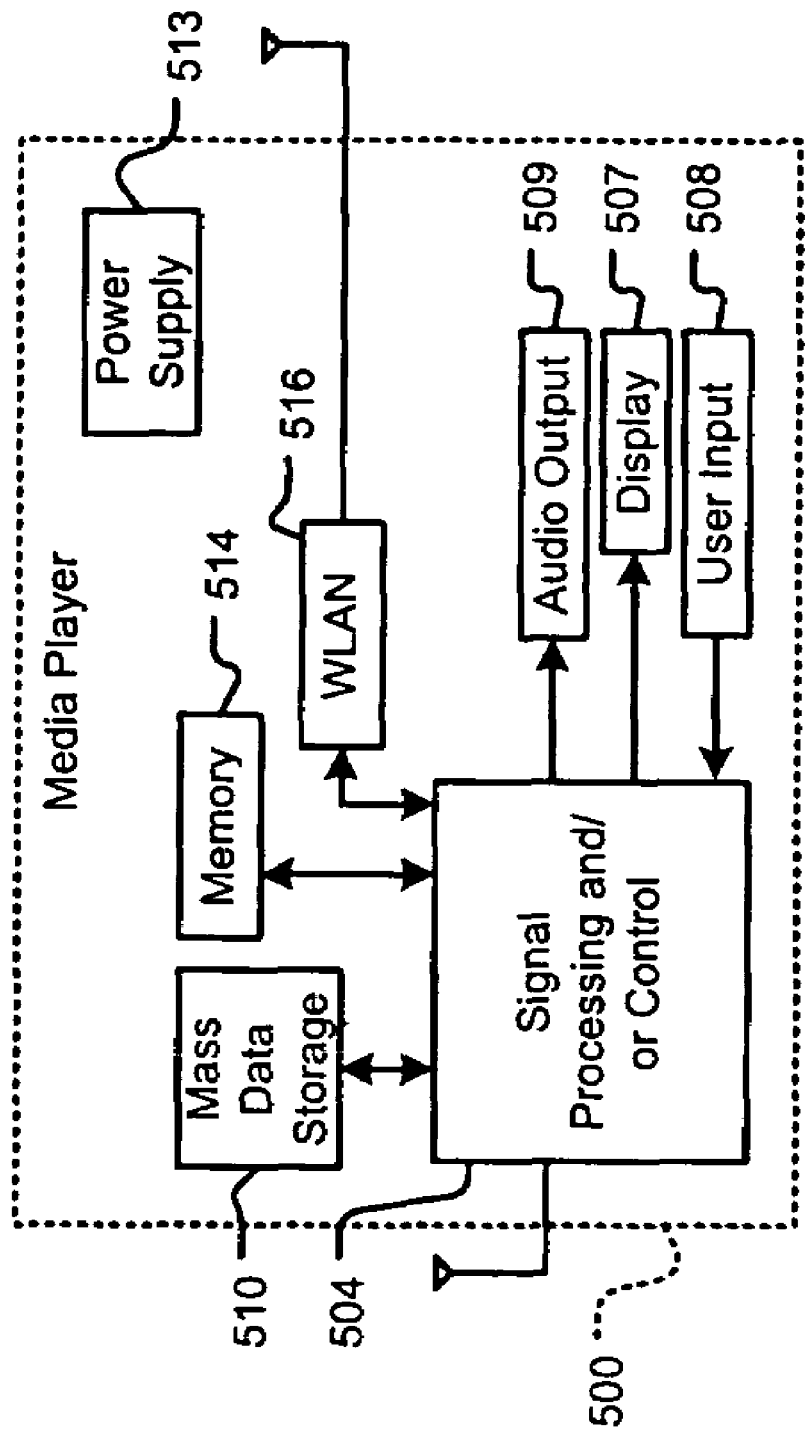
FIG. 9G is a functional block diagram of a media player.

Referring now to FIG. 9G, the device can be implemented in a media player 500. The device may implement and/or be implemented in either or both signal processing and/or control circuits, which are generally identified in FIG. 9G at 504. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated. The media player 500 can include a power supply 483.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. An aggregation channel for providing data communication for M data streams to N data streams, comprising:
    a first first-in, first-out (FIFO) buffer module that receives the M data streams and realigns the M data streams with each other based on respective alignment symbols; and
    a lane mapping module that receives the realigned M data streams from the first FIFO buffer module and routes predetermined ones of the M data streams to predetermined ones of the N data streams, wherein each of the N data streams includes at least one of the alignment symbols, and
    wherein M is greater than N, N is greater than 1, and each of the M data streams includes an alignment symbol.

2. The aggregation channel of claim 1 further comprising N encoders that receive the predetermined ones of the M data streams and encode the N data streams.

3. The aggregation channel of claim 1 further comprising N serializer/deserializer (SERDES) modules that generate respective serial data streams based on associated ones of the N data streams.

4. The aggregation channel of claim 1 wherein the first FIFO buffer module adds and removes idle characters from the M data streams to compensate for a difference in a first data rate of the M data streams and a second data rate of the N data streams.

5. A network device that includes the aggregation channel of claim 1 and N first backplane channels carrying the N data streams.

6. The network device of claim 5 further comprising N second backplane channels that communicate with a deaggregation channel, where the N second backplane channels communicate with first N backplane channels through the aggregation channel and the deaggregation channel.

7. An deaggregation channel for providing data communication for N data streams to M data streams, comprising:
    a first first-in, first-out (FIFO) buffer module that receives and realigns the N data streams based on an alignment symbol included in each of the N data streams; and
    a lane mapping module that segments the realigned N data streams into the M data streams, wherein each of the M data streams includes at least one of the alignment symbols, and
    wherein M is greater than N and N is greater than 1.

8. The deaggregation channel of claim 7 further comprising N decoders that decode associated ones of the N data streams.

9. The deaggregation channel of claim 7 further comprising N serializer/deserializer (SERDES) modules that generate parallel data streams based on associated ones of the N data streams.

10. The deaggregation channel of claim 7 wherein the first FIFO buffer module adds and removes idle characters from the M data streams to compensate for a difference in a first data rate of the M data streams and a second data rate of the N data streams.

11. An aggregation channel for providing data communication for M data streams to N data streams, comprising:
    buffer means for receiving the M data streams and for realigning the M data streams with each other based on respective alignment symbols; and
    lane mapping means for receiving the realigned M data streams from the buffer means and for routing predetermined ones of the M data streams to predetermined ones of the N data streams, wherein each of the N data streams includes at least one of the alignment symbols, and
    wherein M is greater than N, N is greater than 1, and each of the M data streams includes an alignment symbol.

12. The aggregation channel of claim 11 further comprising N encoding means for receiving the predetermined ones of the M data streams and for encoding the N data streams.

13. The aggregation channel of claim 11 further comprising N serializer/deserializer (SERDES) means for generating respective serial data streams based on associated ones of the N data streams.

14. The aggregation channel of claim 11 wherein the buffer means adds and removes idle characters from the M data streams to compensate for a difference in a first data rate of the M data streams and a second data rate of the N data streams.

15. A network device that includes the aggregation channel of claim 11 and N first backplane channels carrying the N data streams.

16. The network device of claim 15 further comprising N second backplane channels that communicate with a deaggregation channel, where the N second backplane channels communicate with first N backplane channels through the aggregation channel and the deaggregation channel.

17. An deaggregation channel for providing data communication for N data streams to M data streams, comprising:
    buffer means for receiving and realigning the N data streams based on an alignment symbol included in each of the N data streams; and
    lane mapping means for segmenting the realigned N data streams into the M data streams, wherein each of the M data streams includes at least one of the alignment symbols, and
    wherein M is greater than N and N is greater than 1.

18. The deaggregation channel of claim 17 further comprising N decoding means for decoding associated ones of the N data streams.

19. The deaggregation channel of claim 17 further comprising N serialize/deserializer (SERDES) means for generating parallel data streams based on associated ones of the N data streams.

20. The deaggregation channel of claim 17 wherein the buffer means adds and removes idle characters from the M data streams to compensate for a difference in a first data rate of the M data streams and a second data rate of the N data streams.

21. A method for providing data communication for M data streams to N data streams, comprising:
    receiving the M data streams;
    realigning the M data streams with each other based on respective alignment symbols;
    routing predetermined ones of the M data streams to predetermined ones of the N data streams via a lane mapping module, wherein each of the N data streams includes at least one of the alignment symbols, and
    wherein M is greater than N, N is greater than 1, and each of the M data streams includes an alignment symbol.

22. The method of claim 21 further comprising receiving the predetermined ones of the M data streams and encode the N data streams.

23. The method of claim 21 further comprising generating respective serial data streams based on associated ones of the N data streams.

24. The method of claim 21 further comprising adding and removing idle characters from the M data streams to compensate for a difference in a first data rate of the M data streams and a second data rate of the N data streams.

25. A method for providing data communication for N data streams to M data streams, comprising:
    receiving and realigning the N data streams based on an alignment symbol included in each of the N data streams; and
    segmenting the realigned N data streams into the M data streams via a lane mapping module, wherein each of the M data streams includes at least one of the alignment symbols, and
    wherein M is greater than N and N is greater than 1.

26. The method of claim 25 further comprising decoding associated ones of the N data streams.

27. The method of claim 25 further comprising generating parallel data streams based on associated ones of the N data streams.

28. The method of claim 25 further comprising adding and removing idle characters from the M data streams to compensate for a difference in a first data rate of the M data streams and a second data rate of the N data streams.

29. A computer readable storage medium that stores a processor-executable program when executed by a processor that includes steps for routing data communication from M data streams to N data streams, the steps comprising:
    receiving the M data streams;
    realigning the M data streams with each other based on respective alignment symbols;
    routing predetermined ones of the M data streams to predetermined ones of the N data streams, wherein each of the N data streams receives at least one of the alignment symbols, and
    wherein M is greater than N, N is greater than 1, and each of the M data streams includes an alignment symbol.

30. The computer readable storage medium of claim 29 wherein the steps further comprise receiving the predetermined ones of the M data streams and encode the N data streams.

31. The computer readable storage medium of claim 29 wherein the steps further comprise generating respective serial data streams based on associated ones of the N data streams.

32. The computer readable storage medium of claim 29 wherein the steps further comprise adding and removing idle characters from the M data streams to compensate for a difference in a first data rate of the M data streams and a second data rate of the N data streams.

33. A computer readable storage medium that stores a processor-executable program when executed by a processor that includes steps for routing data communication from N data streams to M data streams, the steps comprising:
    receiving and realigning the N data streams based on an alignment symbol included in each of the N data streams; and
    segmenting the realigned N data streams into the M data streams, wherein each of the M data streams includes at least one of the alignment symbols, and
    wherein M is greater than N and N is greater than 1.

34. The computer readable storage medium of claim 33 wherein the steps further comprise decoding associated ones of the N data streams.

35. The computer readable storage medium of claim 33 wherein the steps further comprise generating parallel data streams based on associated ones of the N data streams.

36. The computer readable storage medium of claim 33 wherein the steps further comprise adding and removing idle characters from the M data streams to compensate for a difference in a first data rate of the M data streams and a second data rate of the N data streams.

37. The aggregation channel of claim 1 wherein the M data streams are divided into groups and each of the N data streams receives alignment characters from all of the groups.

38. The aggregation channel of claim 1 wherein the M data streams are divided into groups and each of the N data streams receives alignment characters from less than all of the groups.

39. The deaggregation channel of claim 7 wherein the M data streams are divided into groups and each of the groups receives alignment characters from all of the N data streams.

40. The deaggregation channel of claim 7 wherein the M data streams are divided into groups and each of the groups receives alignment characters from less than all of the N data streams.

41. The aggregation channel of claim 11 wherein the M data streams are divided into groups and each of the N data streams receives alignment characters from all of the groups.

42. The aggregation channel of claim 11 wherein the M data streams are divided into groups and each of the N data streams receives alignment characters from less than all of the groups.

43. The deaggregation channel of claim 17 wherein the M data streams are divided into groups and each of the groups receives alignment characters from all of the N data streams.

44. The deaggregation channel of claim 17 wherein the M data streams are divided into groups and each of the groups receives alignment characters from less than all of the N data streams.

45. The method of claim 21 wherein the M data streams are divided into groups and each of the N data streams receives alignment characters from all of the groups.

46. The method of claim 21 wherein the M data streams are divided into groups and each of the N data streams receives alignment characters from less than all of the groups.

47. The method of claim 25 wherein the M data streams are divided into groups and each of the groups receives alignment characters from all of the N data streams.

48. The method of claim 25 wherein the M data streams are divided into groups and each of the groups receives alignment characters from less than all of the N data streams.

49. The computer readable storage medium of claim 29 wherein the M data streams are divided into groups and each of the N data streams receives alignment characters from all of the groups.

50. The computer readable storage medium of claim 29 wherein the M data streams are divided into groups and each of the N data streams receives alignment characters from less than all of the groups.

51. The computer readable storage medium of claim 33 wherein the M data streams are divided into groups and each of the groups receives alignment characters from all of the N data streams.

52. The computer readable storage medium of claim 33 wherein the M data streams are divided into groups and each of the groups receives alignment characters from less than all of the N data streams.

* * * * *